Oct. 7, 1958 W. J. CASEY III 2,855,074
ROTOR BRAKE ACTUATING MECHANISM
Filed Jan. 14, 1957 2 Sheets-Sheet 1

INVENTOR.
William J. Casey, III.
BY
Orrin C.B. Garner
Atty.

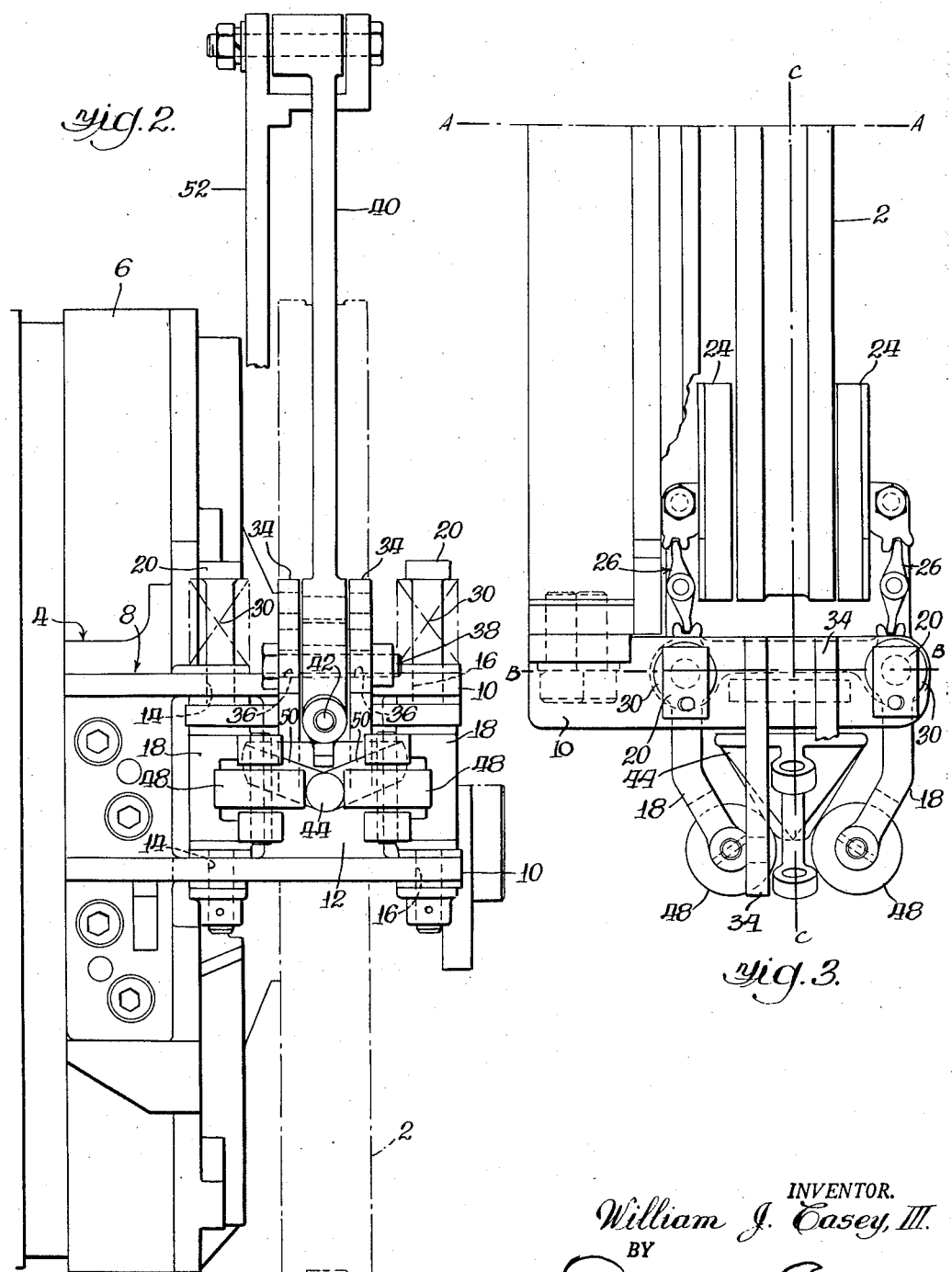

United States Patent Office 2,855,074
Patented Oct. 7, 1958

2,855,074

ROTOR BRAKE ACTUATING MECHANISM

William J. Casey III, Highland Park, Ill., assignor to American Steel Foundries, Chicago, Ill., a corporation of New Jersey Application January 14, 1957, Serial No. 634,118

14 Claims. (Cl. 188—73)

This application is a continuation-in-part of my co-pending application, Serial No. 370,170, filed July 24, 1953, now abandoned.

The invention relates to truck brakes for rail vehicles and more particularly to that type of brake known as a rotor brake.

It is a general object of the invention to provide a novel brake arrangement particularly adapted to the type of rail vehicle employed by street railways and normally used for public transportation of persons in metropolitan areas.

Another object of the invention is to provide a novel mounting and actuating mechanism for the brake of the type described.

A further object of the invention is to provide a rotor brake actuating mechanism adapted to insure the application of equal braking pressures to opposite sides of a brake rotor.

Specifically the invention comprehends a brake arrangement including an articulated lever member having a wedge portion operable to engage and operate shoe carrying brake levers carrying friction shoe assemblies engageable with a related rotor connected to either the wheel and axle assembly of the vehicle or to the drive shaft of a vehicle operating motor when a direct drive is employed between the motor and the wheels of the vehicle, such arrangements being well known to those skilled in the art.

Other objects and advantages of the invention will become apparent from an examination of the attached specification and the concerned drawings, wherein:

Figure 2 is an end view taken along line 2—2 of Figure 1, and

Figure 3 is a top view taken along line 3—3 of Figure 1 with the operating lever removed.

Figure 1:
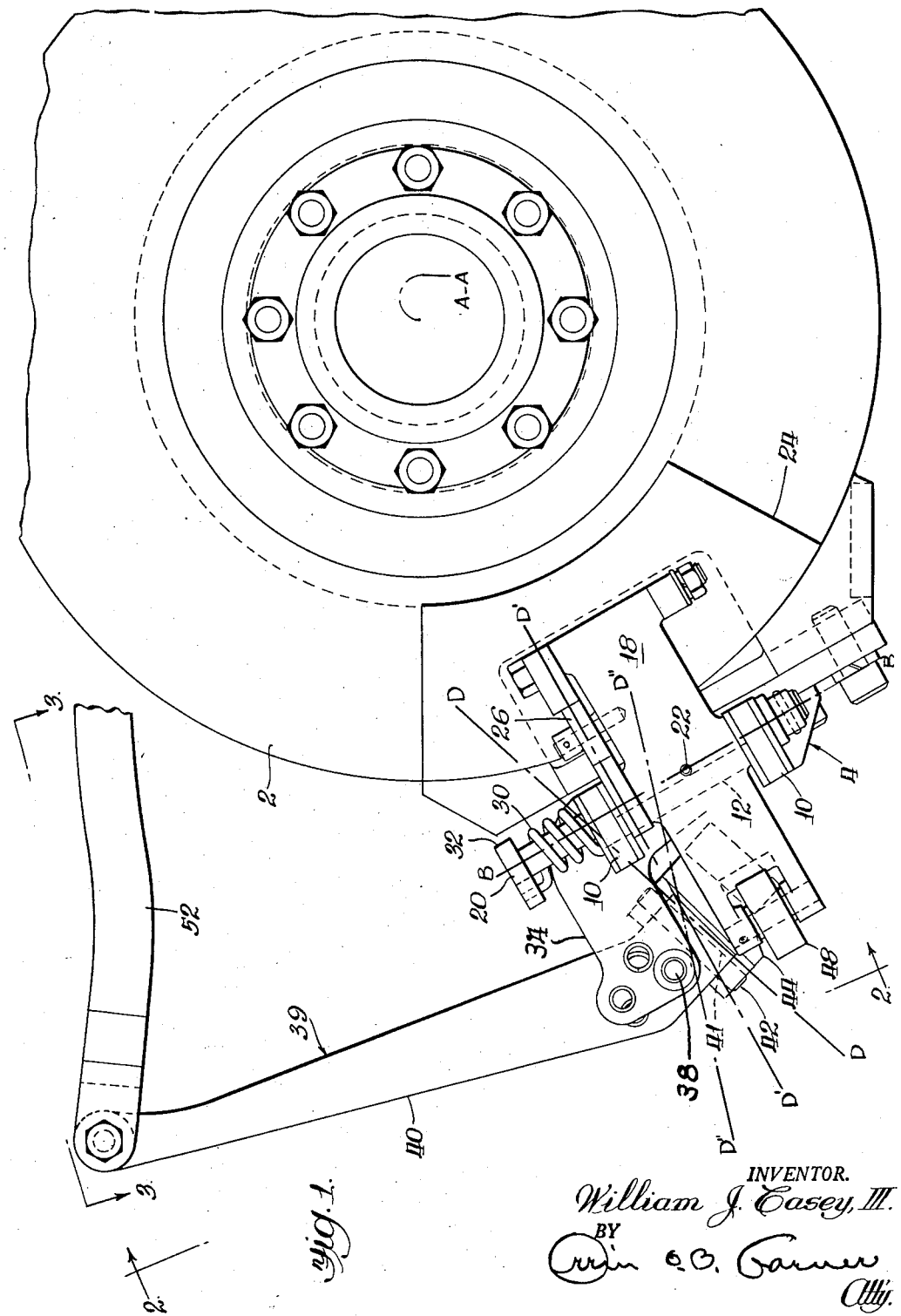
Figure 1 is a side elevational view of the operating parts of the invention.

Describing the invention in detail, a rotor indicated at 2 may be mounted on and to rotate with a wheel and axle assembly (not shown) of a vehicle of the type described or on a shaft of a vehicle driving motor when a direct drive is employed between the motor and the wheels of the vehicle. As best seen in Figure 3, the rotor is disposed to rotate in a preferably vertical plane indicated by the line C—C about a rotational axis which axis is indicated by the line A—A.

Adjacent the rotor 2 a bracket, indicated generally at 4, may be mounted in any convenient manner on the vehicle, for example, on an associated portion of the motor drive housing indicated at 6. The bracket 4 comprises a laterally extending mounting 8, said mounting comprising vertically spaced plates 10. The plates 10 are interconnected by a gusset 12, whereby strength and rigidity is added to the mounting 8. The plates 10 present pairs of spaced vertically aligned pin holes 14 and 16. Received between the plates 10 are longitudinally directed brake levers 18, said brake levers having apertures formed therein which in assembled position are aligned respectively with the pivot holes 14 and 16 of the plates 10. Pivot pins 20 are journally received within the apertures 14 and 16 of the spaced plates 10, said pivot pins being nonrotatably secured to the related brake levers by means of locking pins 22 connecting the related brake lever and associated pivot pin. Thus it will be appreciated that the brake levers 18 are pivotally carried by the bracket 4 and that the pins 20 pivot with the brake levers in the bracket 4. Also it will be seen that the pivotal axes of the brake levers define a plane B—B which extends in a direction parallel to the rotational axis A—A of the rotor and normal to the plane C—C of rotation of the rotor. In other words, the respective brake lever axes can be described as being disposed entirely within the plane B—B.

As noted, the brake levers extend in a direction generally normal to the rotational axis A—A and have corresponding ends pivotally carrying brake head-brake shoe assemblies 24 which are disposed on opposite sides of and engageable with rotor 2. As will be well understood by those familiar with the art, the brake shoes 24 are brought into frictional engagement with opposite sides of the rotor 2 as the brake levers 18 are pivotally actuated in the bracket 4.

Each brake lever 18 has mounted on the upper side thereof a parallel gear arrangement indicated generally at 26 (Figure 3), said gear arrangement serving to maintain the rotor engaging surfaces of the brake shoes 24 in parallel relation to the related surface of the rotor 2 during all pivoted positions of the brake levers 18. This parallel gear arrangement is more fully disclosed in the copending application Serial No. 369,561 of Bernard J. McGuire, filed July 22, 1953.

Each pivot pin 20 has a torsional release spring 30 surrounding said pin, said torsional release spring serving to pivot the associated brake lever 18 and disengage the brake shoe from the associated rotor upon de-actuation of the braking device. Each release spring 30 has its opposite ends respectively connected to the bracket 4 and the head 32 of the related pivot pin 20 as is best seen in Figure 1. When a pivot pin 20 pivots or rotates with the associated brake lever 18 upon actuation of the brake lever, a torsional stress is set up in each spring 30, said torsional stress serving to move the brake lever to disengaged position upon de-actuation of said brake lever.

The bracket 4 has mounted thereon vertically directed spaced mounting plates 34, said plates 34 being rigidly secured to the upper plate 10 intermediate the pivot pins 20. The plates 34 present horizontally aligned bushed pivot holes 36 which receive a pin 38 which in turn pivotally connects an articulated operating or actuator lever member 39 to the bracket 4. The actuator member 39 includes a lever 40 and a wedge 44 pivoted thereto. It will be noted that the fulcrum axis of the lever 40 is preferably horizontal and parallel to the rotational axis A—A.

An aperture 41 is formed at the lower end of the operating lever 40, said aperture 41 serving to receive a pin 42 which pivotally connects the preferably conical wedge portion 44 to the lever 40. Theoretically it can be said that the wedge pivotal axis 42 lies entirely within the common plane C—C, as seen in Figure 3, which extends in a direction normal to axis A—A and plane B—B. In assembled position the wedge is carried intermediate the brake levers 18, and upon pivotal movement of the operating lever 40 about the pivot pin 38 in a brake actuating direction, the conical wedge 44 is carried rearwardly with respect to brake levers 18. It will be understood that because the wedge 44 is pivoted to the lever 40 on an axis 42 which is normal to the fulcrum axis of lever 40, the wedge is carried by or moves with the lever 40 as the lever rotates in common plane C—C about its fulcrum 38. For this reason the wedge is in reality a functional portion of the lever 40 and makes the member 39 a true articulated lever. On the rear extremity of the brake levers 18 rollers 48 are pivotally mounted, said rollers being normally engageable with the wedge surfaces 50 of the conical wedge 44. At its upper end the operating lever 40 is pivotally connected to a conventional brake linkage indicated at 52, said linkage being operatively connected to an air actuating cylinder or the like (not shown) as is well understood by those skilled in the art.

It will also be understood from an examination of Figure 1 of the drawings that the pivotal axis 42 of the wedge portion 44 of operating member 39 forms various angles all of less than 180° with the plane B—B of the brake lever axes. As normal wear of the brake shoes causes them to decrease in size, the ends of the brake levers carrying the brake shoes will move closer to the rotor and toward each other while the opposite ends of the brake levers will move away from each other. As the ends of the levers move apart, the distance between the points of engagement between the lever rollers and wedge surfaces and the pivotal axes of the levers progressively increases. In other words, the angle between the pivotal axis of the wedge and the plane B—B of the brake lever axes varies relative to the degree of wear of the brake shoes but is always less than 180°. In Figure 1 of the drawings, the position of the wedge pivotal axis is shown in a position indicated by the line D—D when the wear of the brake shoes is at a minimum. Additional lines D'—D' and D"—D" represent the positions of the wedge pivotal axis at the midpoint and maximum point, respectively, of brake shoe wear. The ideal position of the pivotal axis of the wedge relative to the plane of the brake lever axes, from the stand-point of efficiency in operation, is that in which the wedge pivotal axis is normal to the plane B—B of the brake lever axes.

The reason that maximum efficiency is achieved by having the pivotal axis of the wedge normal to the plane of the brake lever axes is that a force applied to the operating lever is transmitted with a minimum loss through the wedge to the brake levers. The amount of loss in the force transmitted will increase as the angle of application increases, in accordance with the basic principles of mechanics.

In order for the pivotal axis of the wedge to be in a position normal to the plane of the brake lever axes, the wedge would have to move in a straight line. However, the wedge being a portion of lever 40, it necessarily must move in an arcuate path having a given radius. Since only an arc having an infinite radius would afford straight line movement for the wedge, as a practical matter to approach an optimum operating condition, it is necessary to provide an arrangement wherein the radius of the arcuate path of the wedge is the greatest consistent with the space available. It is also desirable to divide the total arc of action so that the ideal condition is realized at a point approximately midway between the extremities. The ideal condition is realized only when the position of the pivotal axis of the wedge is normal to the plane of the brake lever axes. Taking these factors into consideration, I have provided an arrangement wherein the position of the wedge axis varies with the wear of the brake shoes so that when the brake shoes have minimum or maximum wear, the angle between the pivotal axis of the wedge and the plane of the brake lever axes is slightly less than 90°; and when the midpoint of wear is reached, the angle is approximately 90°. Thus during a great portion of the life of the brake shoes, the arrangement affords a condition as close to the optimum condition as is possible to obtain under practical operating conditions.

An equally important reason for attempting to maintain the pivotal axis of the wedge in a position normal to the plane of the brake lever axes is to insure the application of equal braking pressures by the respective brake shoes to the opposite sides of the rotor. It is well known that brake shoes seldom wear out at the same rate or at the same degree, and it is also known that brake shoes are seldom replaced in pairs but are usually replaced individually. This is, of course, one of the primary reasons for providing a wedging engagement with the brake levers, for such an arrangement permits the wedge to angle relative to the brake levers on its axis 42 which is not parallel to the brake lever axes and tends to equalize the force on the respective brake shoes. A wedging engagement was disclosed in Patent No. 2,360,307, issued to Carl E. Tack on October 10, 1955. While the arrangement disclosed in the Tack patent does assist in equalizing the wear on the respective brake shoes, it does not attempt to equalize the braking pressures applied to the respective shoes because as the wedge angles relative to the brake levers on an axis parallel to the brake lever axes, the levers engage the wedge at points of unequal distance from the pivotal axes of the brake levers or from the fulcrum axis of the operating lever, causing the mechanical advantages of the lever to be unequal relative to the respective brake levers. The reason for this is that the Tack arrangement does not employ an articulated actuator lever but employs an ordinary actuator lever having a link connected to a wedge which is pivotal on an axis parallel to the plane of the brake lever axes. The purpose of this invention is to provide an arrangement wherein the pivotal axis of the wedge is approximately normal for the most part to the plane of the brake lever axes, so that as the wedge angles about its pivotal axis to compensate for unequal sizes of the brake shoes, it still engages the brake levers at points equidistant from their respective axes to insure equal mechanical advantages for the respective brake levers and equal braking pressures.

In operation of the brake arrangement the brake linkage lever 52 is urged to the right as seen in Figure 1, whereupon the operating lever 40 is urged to pivot clockwise about the pin 38 moving the carried conical wedge 44 rearwardly of the brake arrangement and into engagement with the rollers 48 on the rear extremities of the brake levers 18. As the conical wedge is moved rearwardly to engage the rollers 48, the brake levers 18 and carried shoes are urged to pivot and engage opposite sides of the rotor 2, thereby producing equal deceleration of the associated vehicle. Pivotal movement of the brake levers into brake engaging position induces a torsional stress into the springs 30, said torsional stress serving to pivot the brake levers and disengage the brake shoes 24 from the rotor 2 upon de-actuation of the operating lever 40.

I claim:

1. In a rotor brake arrangement for a railway car having at least one wheel and axle assembly with a rotor thereon and a frame supported on said assembly, the combination of: a pair of brake levers pivoted intermediate their ends to the frame on respective axes which define a plane extending parallel to the rotational axis of the rotor, brake shoe assemblies pivotally connected to corresponding ends of the respective brake levers, and an articulated actuator member comprising lever and wedge portions, said lever portion being fulcrumed to the frame on an axis parallel to said rotational axis, said wedge portion being engageable with rollers mounted on ends of the respective brake levers remote from the brake means and being pivoted to said lever portion on an axis in a plane extending in a direction normal to said rotational axis and said lever portion axis, said wedge portion axis forming an angle of less than 180° with said brake lever axes plane.

2. In a rotor brake arrangement for a railway car having a rotor and a frame, the combination of: a pair of brake levers pivoted to the frame on respective axes which define a plane extending in a direction parallel to the rotational axis of the rotor, brake shoe assemblies connected to corresponding ends of the respective brake levers and engageable with opposite sides of the rotor, an articulated actuator member comprising lever and wedge portions, said lever portion being fulcrumed to the frame on an axis parallel to the rotational axis of the rotor, said wedge portion being engageable with the corresponding opposite ends of the respective brake levers and being pivoted to said lever portion on an axis in a plane extending in a direction normal to said rotational axis and lever portion axis and being disposed at an angle of less than 180° with said plane.

3. In a rotor brake arrangement for a vehicle having a rotating member, the combination of: a pair of brake levers fulcrumed to the vehicle, a pair of friction shoe assemblies connected to corresponding ends of the respective brake levers and disposed to engage opposite sides of the member, an articulated operating member comprising a lever fulcrumed to the vehicle on an axis parallel to the rotational axis of said rotating member, and a wedge portion pivoted to the last mentioned lever on an axis in a plane which is normal to said first and second mentioned axes and disposed to form an angle of less than 180° with a plane defined by the axes of the respective brake levers, said wedge being engageable with ends of said brake levers remote from the friction shoe assemblies.

4. In a brake arrangement for a vehicle including a pair of axially spaced rotatable friction surfaces, the combination of: brake means disposed adjacent and engageable with the respective surfaces, a pair of brake levers fulcrumed to the vehicle and having corresponding ends connected to the respective brake means, and an articulated operating member fulcrumed to the vehicle on an axis parallel to the rotational axis of said friction surfaces and having a portion in wedged engagement with opposite corresponding ends of the respective brake levers, said portion being pivotal about an axis in a plane which is normal to said first and second mentioned axes.

5. In a brake arrangement for a vehicle having a rotatable member with axially spaced rotatable friction surfaces and a frame, the combination of: brake means disposed adjacent and engageable with the respective friction surfaces, a pair of brake levers pivoted to the frame on parallel axes and having corresponding ends pivotally connected to the respective brake means, said axes defining a plane extending parallel to the rotational axis of the member, and an operating member comprising pivotally interconnected lever and wedge portions, said wedge portion being engageable with said levers, said lever portion being fulcrumed to the frame on an axis parallel to said rotational axis, the axis of the pivotal connection between the wedge and lever portions being in a plane which is normal to said lever portion axis and forming an angle of less than 180° with the plane defined by said brake lever axes.

6. In a brake arrangement for a vehicle having axially spaced rotatable friction surfaces and a frame, the combination of: a pair of brake levers pivoted to the frame on parallel axes which define a plane, brake means connected to corresponding ends of the respective brake levers and disposed to engage the respective friction surfaces, and an operating member comprising pivotally interconnected lever and wedge portions engageable with opposite corresponding ends of said brake levers, said lever portion being fulcrumed to the frame on an axis extending parallel to said rotational axis, the axis of the pivotal connection between said lever and wedge portions being movable through an arcuate path in a plane extending in the direction normal to said lever portion axis and said first mentioned plane, said pivotal connection axis adapted to form with said brake lever axis plane an angle which varies with the wear of the brake means but which is always less than 180°.

7. In a brake arrangement for a vehicle having axially spaced rotatable friction surfaces and a frame, the combination of: a pair of brake levers pivoted to the frame on parallel axes which define a plane, brake shoes connected to corresponding ends of the respective brake levers and disposed to engage the respective friction surfaces, and an operating member comprising pivotally interconnected lever and wedge portions engageable with opposite corresponding ends of said brake levers, said lever portion being fulcrumed to the frame on an axis extending parallel to the rotational axes of said surfaces, the axis of the pivotal connection between said lever and wedge portions being movable through an arcuate path in a plane extending in the direction normal to said operating lever axis and said first mentioned plane as wear on the brake shoes increases, and wherein the angle between the pivotal connection axis and the brake lever axes plane approaches 90° and then recedes from 90° as the brake shoe wear goes from its point of minimum wear to its point of maximum wear.

8. In a brake arrangement for a vehicle having axially spaced rotatable friction surfaces and a frame, the combination of: brake means engageable with the respective surfaces, brake levers pivoted to the frame on parallel axes and connected at corresponding ends to the respective brake means, and an articulated operating lever fulcrumed to the frame on an axis parallel to the rotational axis of said surfaces and including a wedge portion engageable with opposite corresponding ends of the respective brake levers and pivotal about an axis in a plane which is normal to said operating lever axis.

9. In a brake arrangement for a vehicle having axially spaced rotatable friction surfaces and a frame, the combination of: a pair of brake shoes disposed adjacent and engageable with the respective brake surfaces, brake levers connected at corresponding ends to the respective brake shoes and pivoted to the frame on parallel axes which define a plane, and an articulated member including an actuator lever fulcrumed to the frame on an axis parallel to the rotational axis of the surfaces and a wedge pivoted to the actuator lever and engageable with opposite corresponding ends of the respective brake levers, the pivotal axis of the wedge being in a plane normal to the fulcrum axis of the actuator lever and forming an angle of less than 180° with the plane of the brake lever axes.

10. A brake arrangement according to claim 9, wherein the angle between the wedge pivotal axis and the plane of the brake lever axes varies relative to the degree of wear of the brake shoes.

11. A brake arrangement according to claim 9, wherein the angle between the pivotal axis of the wedge and the plane of the brake lever axes is an acute angle when the degree of brake shoe wear is at its minimum and maximum and wherein the angle is approximately a right angle when the degree of brake shoe wear is at its midpoint.

12. A brake arrangement according to claim 9, wherein the angle between the pivotal axis of the wedge and the plane of the brake lever axes is approximately 90° when the degree of brake shoe wear is at its midpoint.

13. In a brake arrangement for a vehicle having axially spaced rotatable friction surfaces and a frame, a pair of brake shoes disposed adjacent and engageable with the respective surfaces, a pair of brake levers pivoted to the frame and having corresponding ends connected to the respective brake shoes, rollers pivotally mounted on the ends of the respective brake levers remote from said brake means, and an articulated lever fulcrumed to the frame on an axis parallel to the rotational axis of the surfaces and having a wedge portion pivoted thereto about an axis in a plane normal to said first and second mentioned axes presenting a pair of conically formed surfaces engageable with the rollers of the respective brake levers.

14. In a brake arrangement, the combination of: a friction member presenting a pair of oppositely facing axially spaced rotatable friction surfaces, a frame disposed adjacent said surfaces, a pair of brake levers pivoted to the frame, a pair of friction assemblies connected to corresponding ends of the respective brake levers and disposed on opposite sides of the fraction member for engagement with the respective surfaces, the pivotal axes of said brake levers defining a common plane, and an articulated actuator member including pivotally interconnected lever and wedge portions, the lever portion being fulcrumed to the frame on an axis parallel to the rotational axis of said surfaces, the wedge portion presenting surfaces engageable with the respective brake levers and having a pivotal axis in a plane normal to the axis of the lever, the position of which varies with the degree of wear of the friction assemblies but which always forms an angle of less than 180° with the plane of the brake lever axes.

References Cited in the file of this patent

UNITED STATES PATENTS

| | | |
|---|---|---|
| 2,009,179 | Hersot | July 23, 1935 |
| 2,360,307 | Tack et al. | Oct. 10, 1944 |
| 2,406,201 | Coombes | Aug. 20, 1946 |